(12) United States Patent
Li et al.

(10) Patent No.: US 12,670,267 B2
(45) Date of Patent: Jun. 30, 2026

(54) CIPHERTEXT HYBRID OPERATION METHOD AND DEVICE

(71) Applicant: Cloud Intelligence Assets Holding (Singapore) Private Limited, Singapore (SG)

(72) Inventors: Yiran Li, Beijing (CN); Sheng Wang, Beijing (CN); Feifei Li, Zhejiang (CN); Chengjin Tian, Zhejiang (CN); Huorong Li, Beijing (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 65 days.

(21) Appl. No.: 18/847,078

(22) PCT Filed: Mar. 2, 2023

(86) PCT No.: PCT/CN2023/079302
§ 371 (c)(1),
(2) Date: Sep. 13, 2024

(87) PCT Pub. No.: WO2023/174067
PCT Pub. Date: Sep. 21, 2023

(65) Prior Publication Data
US 2025/0209186 A1 Jun. 26, 2025

(30) Foreign Application Priority Data
Mar. 15, 2022 (CN) .......................... 202210252212.3

(51) Int. Cl.
*G06F 21/60* (2013.01)

(52) U.S. Cl.
CPC .................................. *G06F 21/602* (2013.01)

(58) Field of Classification Search
None
See application file for complete search history.

(56) References Cited

U.S. PATENT DOCUMENTS

| | | | |
|---|---|---|---|
| 2017/0126638 A1* | 5/2017 | Ye | H04L 63/0471 |
| 2019/0087354 A1* | 3/2019 | Chhabra | H04L 9/0637 |

(Continued)

FOREIGN PATENT DOCUMENTS

| | | | | |
|---|---|---|---|---|
| CN | 114338021 A | 4/2022 | | |
| EP | 4020272 A1 * | 6/2022 | | G06F 21/46 |

(Continued)

OTHER PUBLICATIONS

Ohkubo et al., "A Length-Invariant Hybrid Mix", ASIACRYPT2000, LNCS 1976, pp. 178-191, 2000 (Year: 2000).*

(Continued)

*Primary Examiner* — Piotr Poltorak
(74) *Attorney, Agent, or Firm* — Osha Bergman Watanabe & Burton LLP

(57) ABSTRACT

A ciphertext hybrid operation method and apparatus are disclosed. The method comprises: receiving a target function signature and a corresponding operand set, the operand set comprising ciphertext operands corresponding to at least two preset ciphertext types; determining a target ciphertext type corresponding to the at least two preset ciphertext types, wherein the target ciphertext type is simultaneously located in paths formed between each of the at least two preset ciphertext types and the highest-level preset ciphertext type; and in a case where the target ciphertext type supports an operation function specified by the target function signature, decrypting all the ciphertext operands in the operand set, converting the decrypted ciphertext operands to use the target ciphertext type for representation, and performing operation on the converted ciphertext operands according to the operation function specified by the target function signature.

20 Claims, 2 Drawing Sheets

(56)            References Cited

U.S. PATENT DOCUMENTS

2022/0078194 A1*  3/2022  Grover ................ H04L 63/0457
2022/0083374 A1*  3/2022  Li  ......................... G06F 9/5027

FOREIGN PATENT DOCUMENTS

GB          2581161    *  5/2019
JP          2002351315   *  5/2001

OTHER PUBLICATIONS

Metzler et al., "Cipherstream Covering for Secure Data Compression", IEEE 978-1-4577-0653-0/11 (Year: 2011).*

* cited by examiner

| sequence number | 0 | 1 | 2 | 3 | 4 | 5 | 6 | 7 | 8 |
|---|---|---|---|---|---|---|---|---|---|
| type | enc_text | enc_time stamp | enc_time stamp' | enc_int4 | enc_int8 | enc_float4 | enc_float8 | enc_decimal | enc_text' |

CIPHERTEXT HYBRID OPERATION METHOD AND DEVICE

The present application claims priority to Chinese Patent Application No. 202210252212.3, filed with the China Patent Office on Mar. 15, 2022 and titled "CIPHERTEXT HYBRID OPERATION METHOD AND DEVICE", which is incorporated herein by reference in its entirety.

TECHNICAL FIELD

This specification relates to the field of ciphertext operation, and, in particular, to a ciphertext hybrid operation method and apparatus.

BACKGROUND

Modern computer systems often need to use different types of data to process different kinds of information. When facing a certain operation using different types of data, a hybrid operation way may be used to obtain an operation result that meets the requirements of this certain operation.

In related technologies, there has been a series of mature solutions for hybrid operation of plaintext data, but the research on hybrid operation of ciphertext data is still in an early stage, and no unified, efficient and clear solution has been formed.

SUMMARY

In view of the above, this specification provides a ciphertext hybrid operation method and apparatus to solve the deficiencies in the related technologies.

Specifically, this specification is implemented through the following technical solutions.

According to a first aspect of embodiments of this specification, there is provided a ciphertext hybrid operation method, which is used for performing a hybrid operation on ciphertexts of a plurality of preset ciphertext types, wherein unidirectional ciphertext conversion relationships pointing to destination ciphertext types from original ciphertext types are set among the plurality of preset ciphertext types, and a multi-level ciphertext conversion relationship is formed based on the unidirectional ciphertext conversion relationships, wherein each preset ciphertext type corresponds to a unique level in the multi-level ciphertext conversion relationship, and at least one path constituted by the unidirectional ciphertext conversion relationships exists between each preset ciphertext type and a highest-level preset ciphertext type, the method including:

receiving a target function signature and a corresponding operand set, the operand set including ciphertext operands corresponding to at least two preset ciphertext types;

determining a target ciphertext type corresponding to the at least two preset ciphertext types, wherein the target ciphertext type is simultaneously located in paths formed between each of the at least two preset ciphertext types and the highest-level preset ciphertext type; and decrypting, in a case where the target ciphertext type supports an operation function specified by the target function signature, all the ciphertext operands in the operand set, converting the decrypted ciphertext operands to use the target ciphertext type for representation, and performing operation on the converted ciphertext operands according to the operation function specified by the target function signature.

According to a second aspect of the embodiments of this specification, there is provided a ciphertext hybrid operation apparatus, which is used for performing hybrid operation on ciphertexts of a plurality of preset ciphertext types, wherein unidirectional ciphertext conversion relationships pointing to destination ciphertext types from original ciphertext types are set among the plurality of preset ciphertext types, and a multi-level ciphertext conversion relationship is formed based on the unidirectional ciphertext conversion relationships, wherein each preset ciphertext type corresponds to a unique level in the multi-level ciphertext conversion relationship, and at least one path constituted by the unidirectional ciphertext conversion relationships exists between each preset ciphertext type and a highest-level preset ciphertext type, the apparatus including:

a data receiving unit for receiving a target function signature and a corresponding operand set, the operand set including ciphertext operands corresponding to at least two preset ciphertext types;

a target ciphertext type determination unit for determining a target ciphertext type corresponding to the at least two preset ciphertext types, wherein the target ciphertext type is simultaneously located in paths formed between each of the at least two preset ciphertext types and the highest-level preset ciphertext type; and a data operation unit for decrypting, in a case where the target ciphertext type supports an operation function specified by the target function signature, all the ciphertext operands in the operand set, converting the decrypted ciphertext operands to use the target ciphertext type for representation, and performing operation on the converted ciphertext operands according to the operation function specified by the target function signature.

According to a third aspect of the embodiments of this specification, there is provided a computer-readable storage medium having a computer program stored thereon, wherein when the program is executed by a processor, steps of the method described in the first aspect are implemented.

According to a fourth aspect of the embodiments of this specification, there is provided an electronic device including a memory, a processor, and a computer program stored in the memory and runnable on the processor, wherein when the processor executes the program, steps of the method described in the first aspect are implemented.

In the technical solutions provided in this specification, by introducing a multi-level ciphertext conversion relationship, conversion relationships among a plurality of preset ciphertext types are effectively managed, so that when ciphertexts of different types of data are used to perform certain operation, conversion relationships of the ciphertexts can be clearly and efficiently determined according to this multi-level ciphertext conversion relationship to obtain a final result that meets the requirements of the above certain operation.

It should be understood that the foregoing general description and the following detailed description are exemplary and explanatory only and cannot limit this specification.

DETAILED DESCRIPTION

Figure 1:
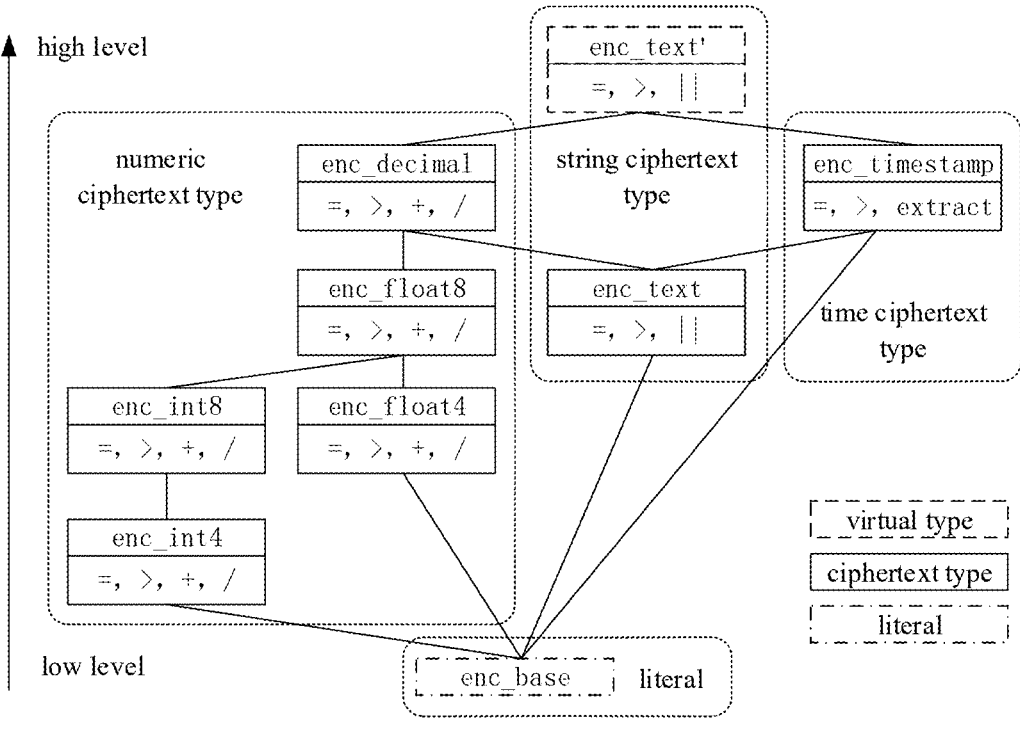
FIG. 1 is a schematic structural diagram of a multi-level ciphertext conversion relationship shown in an exemplary embodiment of this specification.

Exemplary embodiments will now be explained in detail, examples of which are illustrated in the drawings. In a case where the following description refers to the drawings, the same numerals in different drawings denote the same or similar elements, unless otherwise denoted. The implementations described in the following exemplary embodiments do not represent all implementations consistent with this specification. Instead, they are merely instances of apparatuses and methods consistent with some aspects of this specification as detailed in the appended claims.

The terms used in this specification are only for the purpose of describing particular embodiments, and are not intended to limit this specification. Singular forms of "a/an", "the" and "this" used in this specification and the appended claims are also intended to include the plural forms, unless otherwise clearly indicated in the context. It should also be understood that the term "and/or" used herein refers to and contains any or all possible combinations of one or more associated listed items.

It should be understood that although various information may be described employing terms such as first, second, and third in this specification, such information should not be limited to these terms. These terms are only used to distinguish information of the same type from each other. For example, without departing from the scope of this specification, a first information may also be referred to as a second information, and similarly, the second information may also be referred to as the first information. Depending on the context, the word "if" as used here may be interpreted as "as" or "when" or "determining . . . in response to . . . ".

In related technologies, there are applications or systems supporting a weak type of hybrid operation, such as a database system, so that a user does not need to pay attention to operation related to type conversion in a case where any hybrid operation is performed on various types of data during a usage process, but this also leads to that the user cannot intuitively determine whether the above applications or systems support the any hybrid operation. In fact, the above problem may be solved by using a type system, which is a system that prevents programs from having type errors when running hybrid operation or other processes. According to the readability and security of data participating in the hybrid operation, the type system may be divided into a plaintext data type system for plaintext data and a ciphertext data type system for ciphertext data.

As for plaintext data, there is a series of mature plaintext data type systems in the related technologies that support a hybrid operation solution based on type conversion, function overloading, and default rules, which can easily solve the above problems.

However, as for ciphertext data, due to the following problems, the degree of research on ciphertext data type systems is relatively low, and it is, in turn, difficult to solve such problems as easily as plaintext data type systems: 1) no suitable logical structure has been found to be applied to a hybrid operation between ciphertexts of different types; 2) users cannot clearly know a type of a hybrid operation result between the ciphertexts of different types, and the correctness of the result cannot be, in turn, verified; 3) analogous to the hybrid operation solution for plaintext types, a hybrid operation solution that fully supports ciphertext types involves modifying the core logic of an existing system, and implementing categorization and default rules for different ciphertext types, which leads to large development workload and maintenance challenges; 4) a trusted execution environment (TEE) needs to be used for ciphertext type conversion in technologies related to ciphertext type conversion, which incurs high resource overhead; 5) the related technologies do not support hybrid calculation of plaintexts and ciphertexts, which has less application scenarios.

In addition, whether for plaintext data or ciphertext data, it is necessary to undergo a complicated matching operation to determine a type of a hybrid operation result thereof in the related technologies. For example, in a type system, there are functions whose function signatures match int8+float4, int8+int8, float4+float4, decimal+decimal, and int8=float4, respectively, and there is also a target function "a+b", where a type of operand "a" is int8, a type of operand "b" is text. Apparently, there is no function signature that strictly matches "int8+text" in this type system. The above type system first needs to query all function signatures that support "+" (i.e., int8+float4, int8+int8, float4+float4, decimal+decimal), determine function signatures (i.e., int8+float4, int8+int8) with operand types that partially match the operands in the target function, then determine whether operand b may be converted into "float4" or "int8" according to preset rules corresponding to the above type system. If the conversion fails, it needs to determine function signatures (i.e., float4+float4, decimal+decimal) with operand types completely not matching the target function in all function signatures that support "+", and determine, according to the above preset rules, whether "int8" and "text" in the target function may be converted into float4 or decimal respectively. If the above preset rules set that int8 may be converted into float4 or decimal, and text cannot be converted into float4 but may be converted into decimal, the above type system may determine to convert int8 and text into decimal type together, and execute "+" operation.

In order to solve the above problems in the related technologies, this specification provides a ciphertext hybrid operation solution, which is implemented based on a multi-level ciphertext conversion relationship as shown in FIG. 1. FIG. 1 is a schematic structural diagram of a multi-level ciphertext conversion relationship of an exemplary embodiment of this specification. As shown in FIG. 1, this multi-level ciphertext conversion relationship may be used to perform hybrid operation on ciphertexts of a plurality of preset ciphertext types. In the above plurality of preset ciphertext types, there are original ciphertext types and corresponding destination ciphertext types, and unidirectional ciphertext conversion relationships pointing to the destination ciphertext types from the original ciphertext types are set between the two by means of linking. The unidirectional ciphertext conversion relationships define that the above original ciphertext types may be converted into the above destination ciphertext types, but the above destination ciphertext types cannot be converted into the above original ciphertext types. Each preset ciphertext type corresponds to a unique level in the above multi-level ciphertext conversion relationship, and the multi-level ciphertext conversion relationship may be therefore formed by one or more unidirectional ciphertext conversion relationships between the preset ciphertext types. In addition, at least one path constituted by the above unidirectional ciphertext conversion relationship exist between each of the preset ciphertext types and the highest-level preset ciphertext type, which ensures that two preset ciphertext types may at least be converted into the highest-level preset ciphertext type for function operation.

For example, as shown in FIG. 1, this multi-level ciphertext conversion relationship consists of seven preset ciphertext types, where "enc_text" and "enc_text'" belong to different objects of the same preset ciphertext type, and "enc_base" is a literal type other than the preset ciphertext types, and this literal type may be used to represent ciphertext data that does not carry type information. According to the attributes of the preset ciphertext types, the above plurality of preset ciphertext types may be respectively divided into different attributes such as "character ciphertext type", "string ciphertext type", and "time ciphertext type". Each of the preset ciphertext types supports a corresponding operation function, and preset ciphertext types under each attribute support similar operation functions. For example, numeric ciphertext types "enc_int4" and "enc_int8" support 4 operation functions "=, >, +, /", and a string ciphertext type "enc_text" supports three operation functions "=, >, ‖". Meanwhile, in this multi-level ciphertext conversion relationship, there are unidirectional ciphertext conversion relationships pointing to destination ciphertext types from original ciphertext types set between the above plurality of preset ciphertext types. For example, according to levels, a linking between "enc_int4" and "enc_int8" may be represented as a unidirectional ciphertext conversion relationship pointing to "enc_int8" from "enc_int4". Those skilled in the art readily envisage that in a case where there are two operands with ciphertext types that are "enc_int4" and "enc_int8" respectively to perform "=" function operation, a user may readily infer, according to the above ciphertext conversion relationship between "enc_int4" and "enc_int8" and the operation functions supported by "enc_int8", that an operand with the ciphertext type of "enc_int4" is converted into "enc_int8", and then this operand with another operand with the same ciphertext type of "enc_int8" may implement "=" function operation. However, in the related technologies, since there is no conversion relationship containing relevant ciphertexts, this leads to difficulties for the user to predict a ciphertext type of an operation result. Based on the above unidirectional ciphertext conversion relationships, a multi-level ciphertext conversion relationship may be formed, in which at least one path constituted by the above unidirectional ciphertext conversion relationships exist between each of the preset ciphertext types and the highest-level preset ciphertext type "enc_text'", for example, one path "enc_float4"-"enc_float8"-"enc_decimal"-"enc_text'" exists between "enc_float4" and "enc_text'", or two paths "enc_text"-"enc_decimal"-"enc_text'", and "enc_text"-"enc_timestamp"-"enc_text'" exist between "enc_text" and "enc_text'".

As for systems that support bidirectional conversion between the preset ciphertext types of different attributes under some operational functions, such as a database system, a virtual ciphertext type may be set in the above multi-level ciphertext conversion relationship for either party of the preset ciphertext types in the above bidirectional conversion process. The virtual ciphertext type is the same as a ciphertext type of the above either party of the preset ciphertext types.

In an embodiment, in the above multi-level ciphertext conversion relationship exist a first preset ciphertext type and a second preset ciphertext type, and in the case that the above unidirectional ciphertext conversion relationships exist between each other, the above plurality of preset ciphertext types contain a virtual ciphertext type having the same ciphertext type as the above first preset ciphertext type, and a unidirectional ciphertext conversion relationship pointing to the above first preset ciphertext type from the above second preset ciphertext type is replaced with that pointing to the above virtual ciphertext type from the above second preset ciphertext type. The solution of this embodiment enables the above multi-level ciphertext conversion relationship to circumvent a ring structure due to that the above unidirectional ciphertext conversion relationships exist between the two preset ciphertext types from each other. Taking the multi-level ciphertext conversion relationship in FIG. 1 as an example, since the above unidirectional ciphertext conversion relationships exist between preset ciphertext types "enc_decimal" and "enc_text" from each other in a database or other systems, this leads to that other preset ciphertext types cannot determine whether the above highest-level preset ciphertext type is "enc_decimal" or "enc_text". Hence, in the multi-level ciphertext conversion relationship, a virtual ciphertext type "enc_text'" may be created, along with a unidirectional ciphertext conversion relationship pointing to the preset ciphertext type "enc_text'" from the preset ciphertext type "enc_decimal", which, in turn, avoids the unidirectional ciphertext conversion relationship pointing to the preset ciphertext type "enc_text" from the preset ciphertext type "enc_decimal".

Those skilled in the art may understand that levels of the preset ciphertext types in the above multi-level ciphertext conversion relationship may be determined according to actual situations, for example, according to conversion rules for plaintext types having existed in plaintext data type systems in the related technologies, or conventional rules in this field, or representative industry norms, or the levels of the preset ciphertext types are determined by information such as data precision of the preset ciphertext types. For another example, the levels of the preset ciphertext types may be determined according to other rules defined in advance by the user. This specification makes no limitation in this regard.

Figure 2:
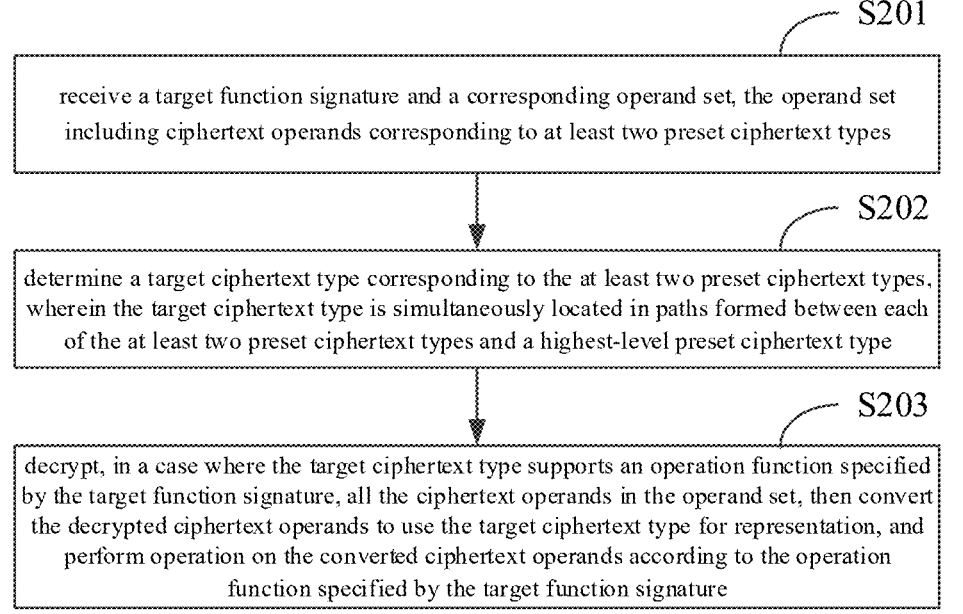
FIG. 2 is a schematic flow chart of a ciphertext hybrid operation method shown in an exemplary embodiment of this specification.

A technical solution of this specification will be set forth below with reference to the embodiment shown in FIG. 2. FIG. 2 is a schematic flow chart of a ciphertext hybrid operation method shown in an exemplary embodiment of this specification. As shown in FIG. 2, this method may include the following steps:

at S201, receiving a target function signature and a corresponding operand set, the operand set including ciphertext operands corresponding to at least two preset ciphertext types.

The above target function signature is description information of a corresponding operation function, and this description information includes, but is not limited to, the number of parameters of the above corresponding operation function, as well as a type of each parameter, and a type of a return value. In other words, the above target function signature points to the corresponding operation function and may be used to define an output and input of this corresponding operation function. Each of operands in the above operand set corresponds to a parameter of the operation function specified by the above target function signature.

In the process of the above ciphertext hybrid operation, the above operand set should contain ciphertext operands corresponding to the at least two preset ciphertext types. Certainly, in a case where the preset ciphertext types corresponding to all the ciphertext operands in the operand set is less than two, it may be determined whether there is a plaintext operand in this operand set, and if so, the plaintext operand may be packaged as a ciphertext operand of a corresponding ciphertext type, so that the above multi-level ciphertext conversion relationship may be compatible with a plaintext hybrid operation or a plaintext and ciphertext hybrid operation; and if not, this means that ciphertext operands only corresponding to the same preset ciphertext type exist in this operand set, and then the above same preset ciphertext type may be directly determined as the target ciphertext type to perform subsequent operations.

In a case where there is an unknown ciphertext type in the above operand set which does not belong to any of the preset ciphertext types, corresponding error information may be prompted to a user, or this unknown ciphertext type may be forcibly converted into a specified preset ciphertext type according to conversion rules defined in advance by the user. This specification makes no limitation in this regard.

The method may further include, at S202, determining a target ciphertext type corresponding to the at least two preset ciphertext types, wherein the target ciphertext type is simultaneously located in paths formed between each of the at least two preset ciphertext types and the highest-level preset ciphertext type.

The above target ciphertext type is a ciphertext type into which the above at least two preset ciphertext types converted jointly in the operation process. In fact, a precondition that the corresponding operation function performs an operation can be satisfied only by unifying types of the above at least two preset ciphertext types.

Since it is impossible to determine a path length of an overlapping part in the paths formed between each of the above at least two preset ciphertext types and the highest-level preset ciphertext type, and the target ciphertext type is come from the preset ciphertext types in the above paths, it may be determined that there may be a case that one or more target ciphertext types are determined simultaneously in the ciphertext hybrid operation based on the multi-level ciphertext conversion relationship.

In an embodiment, in a case where there is a plurality of preset ciphertext types being simultaneously located in paths formed between each of the above at least two preset ciphertext types and the above highest-level preset ciphertext type, the above target ciphertext type is a preset ciphertext type thereof at a lowest level. The above preset ciphertext type at the lowest level ensures the uniqueness in a process of selecting the target ciphertext type. Meanwhile, since an order of determining the plurality of preset ciphertext types in the above paths is performed from a low level at which the above at least two preset ciphertext types are located at the bottom up to the above highest-level preset ciphertext type, selecting the preset ciphertext type at the lowest level in the above paths as the target ciphertext type can save determination operation for additional preset ciphertext types, effectively improving the target ciphertext type. In addition, in the case that the levels of the preset ciphertext types are determined by the data precision as described previously, selecting the preset ciphertext type at the lowest level in the above paths as the target ciphertext type can ensure that the precision of the target ciphertext type is optimized, thereby improving the efficiency of data space management.

The above plurality of preset ciphertext types may be implemented by introducing a particular set type, so as to satisfy a performance requirement for determining the target ciphertext type corresponding to the at least two preset ciphertext types in an actual case. The above particular set type may be a "graph" or "lattice" or other structures, where the "lattice" is a partially ordered set, and any non-empty finite subset thereof has one supremum and one infimum. In a case where the above plurality of preset ciphertext types are implemented by a "lattice" structure, the plurality of preset ciphertext types may belong to elements in the lattice-based partially ordered set.

In an embodiment, a supremum is determined in the above partially-ordered set corresponding to the above at least two preset ciphertext types corresponding to the ciphertext operands in the above operand set, which may serve as the above target ciphertext type. The supremum corresponds to all the preset ciphertext types that are simultaneously located in the paths formed between each of the above at least two preset ciphertext types and the highest-level preset ciphertext type. Hence, the above target ciphertext type may be determined more efficiently and intuitively by determining the supremum in the "lattice" structure. Meanwhile, those skilled in the art may understand that, for example, the foregoing way of selecting the preset ciphertext type at the lowest level in the paths as the target ciphertext type is equivalent to selecting the minimum supremum in this embodiment.

The above partially-ordered set may determine the above target ciphertext type based on a topological sequence. Edges of elements in the topological sequence may correspond to the above unidirectional ciphertext conversion relationships, and a sequence number in the above topological sequence corresponding to an original ciphertext type in each unidirectional ciphertext conversion relationship is smaller than a sequence number in the topological sequence corresponding to a corresponding destination ciphertext type.

In an embodiment, a comparison is made among sequence numbers in the above topological sequence corresponding to N preset ciphertext types of the above at least two preset ciphertext types. In a case where the sequence numbers corresponding to the above N preset ciphertext types are not completely consistent, preset ciphertext types of the above N preset ciphertext types, which correspond to non-maximum sequence numbers, are updated respectively to preset ciphertext types corresponding to edges thereof in the above topological sequence, until the sequence numbers corresponding to the above N preset ciphertext types are consistent. The above N is the number of kinds of preset ciphertext types in the above at least two preset ciphertext types; and a preset ciphertext type in the above topological sequence corresponding to the sequence numbers of the above N preset ciphertext types is determined as the target ciphertext type. Due to a simple structure, convenient maintenance and other advantages of the topological sequence, the technical threshold for users is reduced and the technical feasibility is increased in a case where a multi-level ciphertext conversion relationship is built in a practical application scenario.

Figure 3:
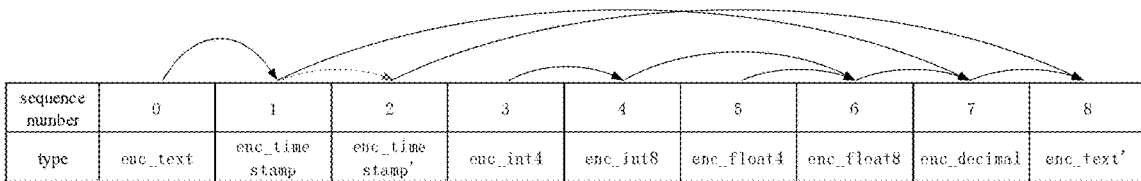
FIG. 3 is a schematic diagram of an optimized ciphertext hybrid operation method shown in an exemplary embodiment of this specification.

Taking determination of the target ciphertext type based on a topological sequence as an example, the technical solutions concerning the above embodiments in this specification will be described in detail with reference to FIG. 3. FIG. 3 is a schematic diagram of an optimized ciphertext hybrid operation method shown in an exemplary embodiment. As shown in FIG. 3, elements and edges in this topological sequence are according to the multi-level ciphertext conversion relationship of FIG. 1. The edges of the elements in the topological sequence may correspond to unidirectional ciphertext conversion relationships in the above multi-level ciphertext conversion relationship. In a case where there are two operands corresponding to preset ciphertext types "enc_timestamp" and "enc_int8" respectively, it is apparent that, in the above topological sequence, sequence numbers of the preset ciphertext types corresponding to the two operands are "2" and "4" respectively. Then, the operand corresponding to the preset ciphertext type with a smaller sequence number (i.e., the preset ciphertext type "enc_timestamp" corresponding to the sequence number 2) may be converted, according to an edge corresponding to the element "enc_timestamp" in the above topological sequence, from the preset ciphertext type "enc_timestamp" to "enc_text'" for representation. At this point, the sequence numbers of the preset ciphertext types corresponding to the two operands are "8" and "4" respectively. Since the above sequence numbers are not consistent, the operand corresponding to the preset ciphertext type with a smaller sequence number (i.e., the preset ciphertext type "enc_int8" corresponding to the sequence number 4) may be converted, according to an edge corresponding to the element "enc_int8" in the above topological sequence, from the preset ciphertext type "enc_int8" to "enc_float8" for representation. At this point, the sequence numbers of the preset ciphertext types corresponding to the two operands are "8" and "6" respectively. Since the above sequence numbers are still not consistent, the operand corresponding to the preset ciphertext type with a smaller sequence number (i.e., the preset ciphertext type "enc_float8" corresponding to the sequence number 6) may be continuously converted, according to an edge corresponding to the element "enc_float8" in the above topological sequence, from the preset ciphertext type "float8" to "enc_decimal" for representation. At this point, the sequence numbers of the preset ciphertext types corresponding to the two operands are "8" and "7" respectively. Since the above sequence numbers are still not consistent, the operand corresponding to the preset ciphertext type with a smaller sequence number (i.e., the preset ciphertext type "enc_decimal" corresponding to the sequence number 7) may be continuously converted, according to an edge corresponding to the element "enc_decimal" in the above topological sequence, from the preset ciphertext type "decimal" to "enc_text'" for representation. At this point, the sequence numbers of the preset ciphertext types corresponding to the two operands are both "8", that is, the sequence numbers of the preset ciphertext types corresponding to the two operands are the same, and the preset ciphertext type "enc_text'" corresponding to the sequence number "8" in the above topological sequence may be determined as the target ciphertext type.

Since a literal type does not carry type information, in a case where operation is performed on the literal type under a system similar to a database with any ciphertext type, the type system may preferentially attempt to directly convert this literal type to any of the above ciphertext types for representation, and if the conversion fails, this type system may prompt a user with corresponding error information. In summary, it is unnecessary to intentionally set an element on the literal type "enc_base" in the above topological sequence.

Since there may be a plurality of unidirectional ciphertext conversion relationships pointing to different destination ciphertext types from the same original ciphertext type in the multi-level ciphertext conversion relationship, the above virtual ciphertext type may be set in the above topological sequence to establish a unidirectional ciphertext conversion relationship pointing to this virtual ciphertext type from this original ciphertext type and unidirectional ciphertext conversion relationships pointing to the above different destination ciphertext types from this virtual ciphertext type. This virtual ciphertext type may be used to compare sequence numbers of the virtual ciphertext type and each destination ciphertext type of the above different destination ciphertext types in the topological sequence. If they are the same, this original ciphertext type will be converted to the each destination ciphertext type for representation; otherwise, a continuous attempt will be made to compare sequences numbers of this virtual ciphertext type and the other destination ciphertext types of the above different target ciphertext types in the topological sequence. The application of this virtual ciphertext type reduces the determination complexity of determining one of the above plurality of unidirectional ciphertext conversion relationships pointing to the different destination ciphertext types from the same original ciphertext type, and, in turn, improves the efficiency of hybrid operation based on this multi-level ciphertext conversion relationship.

Taking the topological sequence in FIG. 3 as an example, since unidirectional ciphertext conversion relationships exist between the preset ciphertext type "enc_text" and the preset ciphertext types "enc_timestamp" and "enc_decimal" respectively, a virtual ciphertext type "enc_timestamp'" may be set with a sequence number "2" in this topological sequence. In a case where function operation is performed on two operands respectively corresponding to preset ciphertext types "enc_text" and "enc_timestamp", the operand corresponding to the preset ciphertext type "enc_text" may be converted to be represented by using the preset ciphertext type "enc_timestamp'", and then sequence numbers of the preset ciphertext types corresponding to the two operands may be determined. Since the preset ciphertext types "enc_timestamp'" and "enc_timestamp" actually belong to the same ciphertext type, sequence numbers "1" and "2" of the preset ciphertext types "enc_timestamp'" and "enc_timestamp" may be regarded as the same sequence number, so that the operand corresponding to the preset ciphertext type "enc_timestamp'" may be converted to use the preset ciphertext type "enc_timestamp" for representation. Alternatively, in a case where function operation is performed on two operands respectively corresponding to preset ciphertext types "enc_text" and "enc_int8", the operand corresponding to the preset ciphertext type "enc_text" is converted to use the preset ciphertext type "enc_timestamp'" for representation, and then sequence numbers of the preset ciphertext types corresponding to the two operands are determined. Apparently, the sequence numbers corresponding to the preset ciphertext types "enc_int8" and "enc_timestamp'" are not equal, and then the operand corresponding to the preset ciphertext type "enc_timestamp'" is converted to use the preset ciphertext type "enc_text" for representation, which is followed by continuously comparing sequence numbers of the corresponding preset ciphertext types with the operand corresponding to the preset ciphertext type "enc_int8", and repeating the above operations until sequence numbers in this topological sequence corresponding to ciphertext types of two operands are equal.

The method may further include, at S203, decrypting, in a case where the target ciphertext type supports an operation function specified by the target function signature, all the ciphertext operands in the operand set, converting the decrypted ciphertext operands to use the target ciphertext type for representation, and performing operation on the converted ciphertext operands according to the operation function specified by the target function signature.

Since different ciphertext types support different operation functions, in the ciphertext hybrid operation based on the multi-level ciphertext conversion relationship, corresponding operations may be carried out according to support situations of the above target ciphertext type for the operation function specified by the above target function signature.

In a case where it is determined that the above target ciphertext type supports the operation function specified by the above target function signature, all the ciphertext operands in the operand set may be decrypted into plaintext operands, then the plaintext operands may be converted to use the above target ciphertext type for representation, and a final operation result may be obtained according to the operation function in the above target function signature. For example, there is a target function signature A containing only two operands, and a specified operation function is "+". In a case where ciphertext types of the two operands are "enc_int4" and "enc_text" respectively and correspond to plaintext "12" and "3" respectively, and a target ciphertext type is "enc_decimal", the ciphertext types of the above two operands may be jointly converted to use "enc_decimal" for representation and operation is performed to obtain a final operation result "15". Meanwhile, those skilled in the art may understand that the above "all the ciphertext operands" may be all operands in the operand set. For example, operands a, b and c of different ciphertext types only exist in the above operand set, and in a case where the above operation function is "a+b+c" and the target ciphertext type supports the "+" function, a, b and c may be decrypted and converted to use the above target ciphertext type for representation. Alternatively, the above "all the ciphertext operands" may be operands in the operand set corresponding to part of the above operation function. For example, operands a, b and c of different ciphertext types exist in the above operand set and the above operation function is "(a+b)‖c", and if there is no preset ciphertext type that supports both "+" and "|" in the multi-level ciphertext conversion relationship, then the above operation function "(a+b)‖c" may be taken as a parent operation function and split into two son operation functions, with each son operation function only containing part operation function of this parent operation function, where: a son operation function "(a+b)" may be taken as an independent operation function to determine a target ciphertext type corresponding to the operands a and b involved in this son operation function, then an operation result of this son operation function "(a+b)" may be taken as a new operand d to participate in function operation of the other son operation function "d‖c", and this son operation function "d‖c" is taken as an independent operation function to determine a target ciphertext type corresponding to the operands d and c involved in this son operation function. As can be seen, as for a relatively complex operation function, this specification may split this operation function as a parent operation function, and determine a target ciphertext type for each son operation function formed by splitting, so that a function operation process of each son operation function may be regarded as an independent hybrid operation, and a hybrid operation result of the parent operation function may be obtained finally. If a son operation function does not rely on other son operation functions, such as the above son operation function "(a+b)", then operands involved in this son operation function are all from an operand set corresponding to the parent operation function. If a son operation function relies on other son operation functions, such as the above son operation function "d‖c", then operands involved in this son operation function may partly come from the operand set corresponding to the parent operation function (e.g., operand c), and there must be at least a part of operands that are operation results of the other son operation functions on which it relies (e.g., operand d), and even all operands involved therein may come from operation results of the other son operation functions on which it relies.

In a case where it is determined that the above target ciphertext type does not support the operation function specified by the above target function signature, another preset ciphertext type may be selected in a path formed between the above target ciphertext type and the above highest-level preset ciphertext type to update the above target ciphertext type, where the other preset ciphertext type supports the function corresponding to the above target function signature. The operation of updating the above target ciphertext type contains a design idea of "loop traversal", that is, a final target ciphertext type is determined by repeatedly attempting to determine whether the above other preset ciphertext type supports the function corresponding to the above target function signature, where an order of selecting the above other preset ciphertext type may be set according to level or other rules. This specification makes no limitation in this regard. In the case that the above target ciphertext type does not support the function corresponding to the above target function signature and there are no other preset ciphertext types at levels greater than the level of the above target ciphertext type, corresponding error information may be prompted to a user.

In a case where the above operand set contains an operand of a literal type, it may be guaranteed that the operand of this literal type may still participate in the operation of the above operation function.

In an embodiment, the above ciphertext operands corresponding to the at least two preset ciphertext types and the ciphertext operand corresponding to the literal type are decrypted and then converted to use the above target ciphertext type for representation respectively, and operation is performed on the converted ciphertext operands according to the operation function specified by the above target function signature. For example, as described previously, the literal type may be used to represent ciphertext data that does not carry type information, and an attempt hence may be made to decrypt the above ciphertext operand corresponding to the literal type together with the above ciphertext operands corresponding to the at least two preset ciphertext types, and convert them into operands of the target ciphertext type to participate in a subsequent operation process.

The preset ciphertext types contained in the above plurality of preset ciphertext types and any unidirectional ciphertext conversion relationship in the above multi-level ciphertext conversion relationship may be modified according to actual needs.

In an embodiment, the above multi-level ciphertext conversion relationship may adjust, according to a received adjustment instruction, preset ciphertext types contained in the above plurality of preset ciphertext types and/or any unidirectional ciphertext conversion relationship in the multi-level ciphertext conversion relationship. The adjustment instruction may contain a title of a certain preset ciphertext type, a supported operation function, and feature information of a certain unidirectional ciphertext conversion relationship in the above multi-level ciphertext conversion relationship. According to this adjustment instruction, the above certain preset ciphertext type and/or the above certain unidirectional ciphertext conversion relationship may be added to the above multi-level ciphertext conversion relationship; or data corresponding to the above certain preset ciphertext type and/or the above certain unidirectional ciphertext conversion relationship in the above multi-level ciphertext conversion relationship may be deleted or modified.

Those skilled in the art may understand that the solutions of this specification may decrypt, based on TEE, all the ciphertext operands in the operand set, then convert the decrypted ciphertext operands to use the target ciphertext type for representation, and perform operation on the converted ciphertext operands according to the operation function specified by the target function signature. Compared with the related technologies, since provisions of ciphertext operation rules require that at least two TEE operations need to be executed (i.e., a first TEE operation: decrypting ciphertext operands in TEE to obtain plaintext operands and converting the plaintext operands into a corresponding target ciphertext type, and then encrypting the plaintext operands into ciphertext operands; and a second TEE operation of decrypting the encrypted ciphertext operands again into plaintext operands, performing operation on the plaintext operands according to a target function, and encrypting and outputting an operation result), the solutions in this specification may complete ciphertext hybrid operation only by executing one TEE operation (i.e., decrypting plaintext operands in TEE to obtain plaintext operands, then converting the plaintext operands to a corresponding target ciphertext type, performing operation on the plaintext operands according to a target function, and finally encrypting and outputting an operation result), which, in turn, reduces the system overhead caused by using the TTE, and improves the efficiency of executing TEE operations.

As can be known from the above embodiments, the ciphertext hybrid operation method in this specification, by introducing a lattice-based multi-level ciphertext conversion relationship, effectively manages conversion relationships among a plurality of preset ciphertext types, so that in a case where a user uses ciphertexts of different types of data to perform certain operation, conversion relationships of the ciphertexts may be clearly and efficiently determined according to this multi-level ciphertext conversion relationship to obtain a final result that meets the requirements of the above certain operation. Meanwhile, the above multi-level ciphertext conversion relationship may be embedded as an independent subsystem in products that have been involved in ciphertext calculation, and this process does not involve changing the core logic of an existing system, so that the above multi-level ciphertext conversion relationship is easy to add new types and functions, or other operations. In addition, the multi-level ciphertext conversion relationship can achieve lower system overheads than traditional ciphertext operation methods while implementing complete function match. Further, since the above ciphertext data type system can support plaintext and ciphertext hybrid calculation by means of packing plaintexts into corresponding ciphertext types, the application scenarios of this multi-level ciphertext conversion relationship in this specification are improved.

Figure 4:
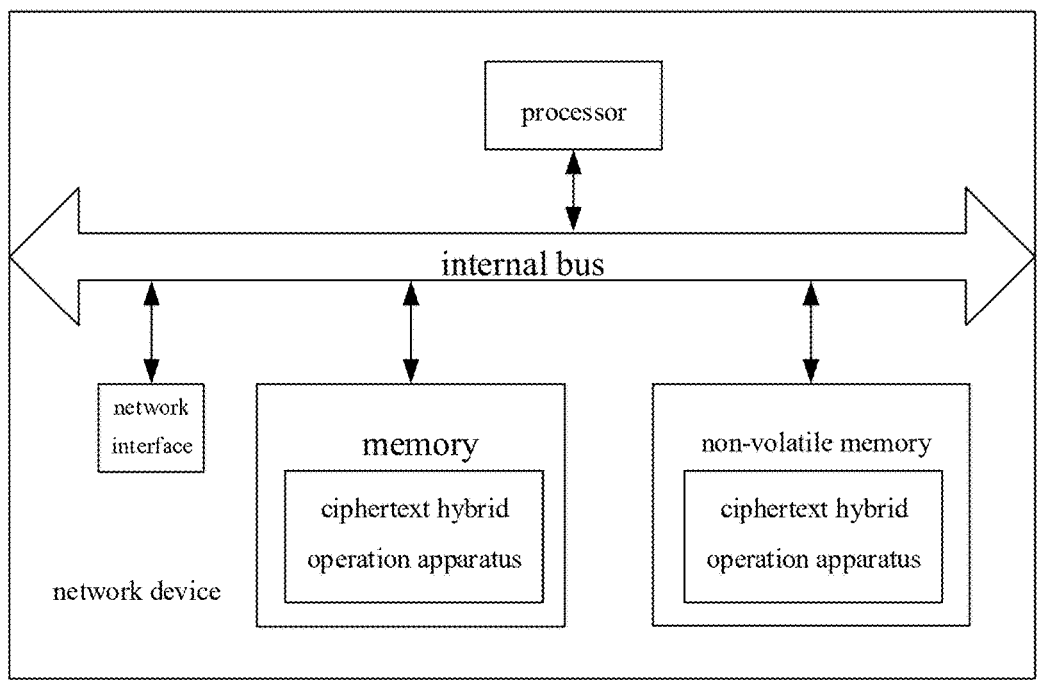
FIG. 4 is a schematic structural diagram of an electronic device shown in an exemplary embodiment of this specification.

FIG. 4 is a schematic structural diagram of an electronic device in an exemplary embodiment. Referring to FIG. 4, at a hardware level, this electronic device includes a processor, an internal bus, a network interface, a memory, and a non-volatile memory, and, certainly, may further include hardware needed for other functions. The processor reads a corresponding computer program from the non-volatile memory into the memory and then runs it, forming a ciphertext hybrid operation apparatus at a logical level. Certainly, in addition to the software implementation, this specification does not exclude other implementations by means of, for example, a logic device or a combination of software and hardware, or the like. That is to say, an execution subject of the following processes is not limited to respective logic units, and may also be hardware or a logic device.

Corresponding to the foregoing embodiments of the ciphertext hybrid operation method, this specification further provides an embodiment of a ciphertext hybrid operation apparatus.

Figure 5:
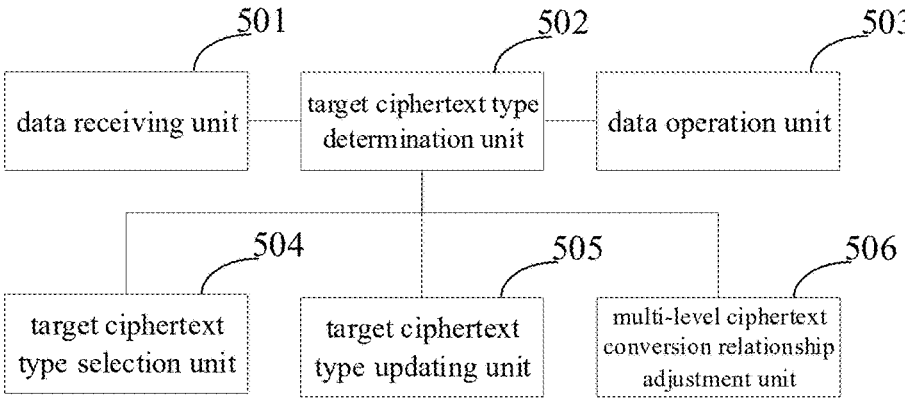
FIG. 5 is a schematic structural diagram of a ciphertext hybrid operation apparatus shown in an exemplary embodiment of this specification.

Referring to FIG. 5, FIG. 5 is a schematic structural diagram of a ciphertext hybrid operation apparatus shown in an exemplary embodiment. As shown in FIG. 5, in a software implementation, this ciphertext hybrid operation apparatus is used for performing hybrid operation on ciphertexts of a plurality of preset ciphertext types, wherein unidirectional ciphertext conversion relationships pointing to destination ciphertext types from original ciphertext types are set among the plurality of preset ciphertext types, and a multi-level ciphertext conversion relationship is formed based on the unidirectional ciphertext conversion relationships, wherein each preset ciphertext type corresponds to a unique level in the multi-level ciphertext conversion relationship, and at least one path constituted by the unidirectional ciphertext conversion relationships exists between each preset ciphertext type and a highest-level preset ciphertext type, this ciphertext hybrid operation apparatus including:

a data receiving unit 501 for receiving a target function signature and a corresponding operand set, the operand set including ciphertext operands corresponding to at least two preset ciphertext types;

a target ciphertext type determination unit 502 for determining a target ciphertext type corresponding to the at least two preset ciphertext types, wherein the target ciphertext type is simultaneously located in paths formed between each of the at least two preset ciphertext types and the highest-level preset ciphertext type; and a data operation unit 503 for decrypting, in a case where the target ciphertext type supports an operation function specified by the target function signature, all the ciphertext operands in the operand set, converting the decrypted ciphertext operands to use the target ciphertext type for representation, and performing operation on the converted ciphertext operands according to the operation function specified by the target function signature.

Optionally, the apparatus further includes:

a target ciphertext type selection unit 504 for, in a case where there are a plurality of preset ciphertext types being simultaneously located in the paths formed between each of the at least two preset ciphertext types and the highest-level preset ciphertext type, determining a preset ciphertext type at a lowest level as the target ciphertext type.

Optionally, the data operation unit 503 is specifically used for decrypting the ciphertext operands corresponding to the at least two preset ciphertext types and a ciphertext operand corresponding to a literal type, then converting the decrypted ciphertext operands respectively to use the target ciphertext type for representation, and performing operation on the converted ciphertext operands according to the operation function specified by the target function signature.

Optionally, the plurality of preset ciphertext types belong to elements in a lattice-based partially-ordered set, and the target ciphertext type determination unit 502 is specifically used for:

determining a suprema in the partially-ordered set corresponding to the at least two preset ciphertext types corresponding to the ciphertext operands in the operand set, using the suprema as the target ciphertext type.

Optionally, the partially-ordered set is represented based on a topological sequence, edges of respective elements in the topological sequence correspond to the unidirectional ciphertext conversion relationships, and a sequence number in the topological sequence corresponding to an original ciphertext type in each unidirectional ciphertext conversion relationship is smaller than a sequence number in the topological sequence corresponding to a corresponding destination ciphertext type; and the target ciphertext type determination unit 502 is specifically used for:

comparing sequence numbers in the topological sequence corresponding to N preset ciphertext types of the at least two preset ciphertext types, and respectively updating, in a case where the sequence numbers corresponding to the N preset ciphertext types are not completely consistent, preset ciphertext types of the N preset ciphertext types which correspond to non-maximum sequence numbers to preset ciphertext types corresponding to edges thereof in the topological sequence, until the sequence numbers corresponding to the N preset ciphertext types are consistent, wherein N is the number of kinds of preset ciphertext types in the at least two preset ciphertext types; and determining a preset ciphertext type in the topological sequence corresponding to the sequence numbers of the N preset ciphertext types as the target ciphertext type.

Optionally, the apparatus is specifically used for:

in a case where the unidirectional ciphertext conversion relationships exist between a first preset ciphertext type and a second preset ciphertext type from each other, the plurality of preset ciphertext types comprise a virtual ciphertext type having a ciphertext type the same as the first preset ciphertext type, and a unidirectional ciphertext conversion relationship in which the second preset ciphertext type points to the first preset ciphertext type is replaced with that in which the second preset ciphertext type points to the virtual ciphertext type.

Optionally, the apparatus further includes:

a target ciphertext type updating unit 505 for selecting, in a case where the target ciphertext type does not support a function corresponding to the target function signature, another preset ciphertext type in a path formed between the target ciphertext type and the highest-level preset ciphertext type to update the target ciphertext type, wherein the other preset ciphertext type support the function corresponding to the target function signature.

a multi-level ciphertext conversion relationship adjustment unit 506 for adjusting, according to a received adjustment instruction, preset ciphertext types contained in the plurality of preset ciphertext types and/or any unidirectional ciphertext conversion relationship in the multi-level ciphertext conversion relationship.

Details of an implementation process of functions and effects of each unit in the above apparatuses may specifically refer to an implementation process of corresponding steps in the above methods, which will not be repeated here.

For the apparatus embodiments, since they basically correspond to the method embodiments, the relevant parts may refer to some of the explanations of the method embodiments. The apparatus embodiments described above are merely exemplary, in which units explained as discrete components may or may not be physically separated, and components shown as units may or may not be physical units, that is, may be located in one place, or may also be distributed over a plurality of network units. Some or all of the modules may be selected according to actual needs to achieve the objectives of the solutions of this specification. Those of ordinary skill in the art may understand and implement without creative labor.

Embodiments of the subject matters and the functional operations described in this specification may be implemented in digital electronic circuitry, tangibly embodied computer software or firmware, computer hardware including structures disclosed in this specification and structural equivalents thereof, or a combination of one or more of them. The embodiments of the subject matters described in this specification may be implemented as one or more computer programs, i.e., one or more modules of computer program instructions encoded on a tangible, non-transitory program carrier to be executed by, or to control the operation of, a data processing apparatus. Alternatively, or additionally, the program instructions may be encoded on artificially generated propagated signals, such as machine-generated electrical, optical, or electromagnetic signals, which are generated to encode and transmit information to a suitable receiver apparatus to be executed by a data processing apparatus. A computer storage medium may be a machine-readable storage device, a machine-readable storage substrate, a random or serial access memory device, or a combination of one or more of them.

The processing and logic flows described in this specification may be executed by one or more programmable computers that execute one or more computer programs, so as to execute corresponding functions by performing operations according to input data and generating output. The processing and logic flows may also be executed by special-purpose logic circuitry, and the apparatus may also be implemented as special-purpose logic circuitry, such as an FPGA (field programmable gate array) or an ASIC (application specific integrated circuit).

Computers suitable for executing computer programs include, for example, general- and/or special-purpose microprocessors, or any other type of central processing unit. Typically, the central processing unit will receive instructions and data from read only memory and/or random access memory. Basic components of a computer include a central processing unit for implementing or executing instructions and one or more memory devices for storing instructions and data. Typically, the computer will further include one or more mass storage devices for storing data, such as a magnetic disk, a magneto-optical disk, an optical disk, or the like, or the computer will be operably coupled to such mass storage devices to receive data therefrom or transfer data thereto, or both. However, the computer does not have to have such devices. In addition, the computer may be embedded in another device, such as a mobile phone, a personal digital assistant (PDA), a mobile audio or video player, a game console, a global positioning system (GPS) receiver, or a portable storage device such as a universal serial bus (USB) flash drive, to name a few.

Computer-readable media suitable for storing computer program instructions and data include all forms of non-volatile memory, media and memory devices, such as a semiconductor memory device (e.g., an EPROM, an EEPROM and a flash memory device), a magnetic disk (e.g., an internal hard disk or a removable disk), a magnetic disk, and a CD ROM disk and a DVD-ROM disk. The processor and memory may be supplemented by or incorporated into special purpose logic circuitry.

While this specification contains many specific implementation details, these should not be construed as limiting the scope of any invention or what is claimed, but rather as primarily describing features of specific embodiments of particular inventions. Certain features described within this specification in a plurality of embodiments may also be implemented in combination in a single embodiment. On the other hand, various features described in a single embodiment may also be implemented separately or in any suitable sub-combination in a plurality of embodiments. In addition, while features may function as described above in certain combinations and even initially claimed as such, one or more features from a claimed combination may, in some cases, be removed from this combination, and the claimed combination may be directed to a sub-combination or a variation thereof.

Similarly, while operations are depicted in the drawings in a particular order, this should not be understood as requiring that such operations be executed in the particular order as shown or sequentially, or that all illustrated operations be executed, to achieve desirable results. In some cases, multitasking and parallel processing may be advantageous. In addition, the separation of various system modules and components in the embodiments described above should not be understood as requiring such separation in all embodiments, and it should be understood that the described program components and systems may generally be integrated together in a single software product, or packaged into a plurality of software products.

Thus, specific embodiments of the subject matters have been described. Other embodiments are within the scope of the appended claims. In some cases, the actions recited in the claims may be executed in a different order and still achieve desirable results. In addition, the processing depicted in the drawings does not necessarily require a particular order as shown, or a sequential order, to achieve the desired results. In some implementations, multitasking and parallel processing may be advantageous.

Described above are merely preferred embodiments of this specification, which are not intended to limit this specification. Any modification, equivalent replacement, improvement, or the like made within the spirit and principle of this specification should be contained within the scope of protection of this specification.

What is claimed is:

1. A ciphertext hybrid operation method, which is used for performing a hybrid operation on ciphertexts of a plurality of preset ciphertext types, wherein unidirectional ciphertext conversion relationships pointing to destination ciphertext types from original ciphertext types are set among the plurality of preset ciphertext types, and a multi-level ciphertext conversion relationship is formed based on the unidirectional ciphertext conversion relationships, wherein each preset ciphertext type corresponds to a unique level in the multi-level ciphertext conversion relationship, and at least one path constituted by the unidirectional ciphertext conversion relationships exists between each preset ciphertext type and a highest-level preset ciphertext type, the method comprises:

receiving a target function signature and a corresponding operand set, the operand set comprising ciphertext operands corresponding to at least two preset ciphertext types;

determining a target ciphertext type corresponding to the at least two preset ciphertext types, wherein the target ciphertext type is simultaneously located in paths formed between each of the at least two preset ciphertext types and the highest-level preset ciphertext type; and decrypting, in a case where the target ciphertext type supports an operation function specified by the target function signature, all the ciphertext operands in the operand set, converting the decrypted ciphertext operands to use the target ciphertext type for representation, and performing operation on the converted ciphertext operands according to the operation function specified by the target function signature.

2. The method according to claim 1, further comprising:

in a case where there are a plurality of preset ciphertext types being simultaneously located in the paths formed between each of the at least two preset ciphertext types and the highest-level preset ciphertext type, the target ciphertext type is a preset ciphertext type at a lowest level.

3. The method according to claim 1, wherein decrypting all the ciphertext operands in the operand set, converting the decrypted ciphertext operands to use the target ciphertext type for representation, and performing the operation on the converted ciphertext operands according to the operation function specified by the target function signature comprises:

decrypting the ciphertext operands corresponding to the at least two preset ciphertext types and a ciphertext operand corresponding to a literal type, then converting the decrypted ciphertext operands respectively to use the target ciphertext type for representation, and performing the operation on the converted ciphertext operands according to the operation function specified by the target function signature.

4. The method according to claim 1, wherein the plurality of preset ciphertext types belong to elements in a lattice-based partially-ordered set, and determining the target ciphertext type corresponding to the at least two preset ciphertext types comprises:

determining a suprema in the partially-ordered set corresponding to the at least two preset ciphertext types corresponding to the ciphertext operands in the operand set, using the suprema as the target ciphertext type.

5. The method according to claim 4, wherein the partially-ordered set is represented based on a topological sequence, edges of respective elements in the topological sequence correspond to the unidirectional ciphertext conversion relationships, and a sequence number in the topological sequence corresponding to an original ciphertext type in each unidirectional ciphertext conversion relationship is smaller than a sequence number in the topological sequence corresponding to a corresponding destination ciphertext type; and determining the target ciphertext type corresponding to the at least two preset ciphertext types comprises:

comparing sequence numbers in the topological sequence corresponding to N preset ciphertext types of the at least two preset ciphertext types, and respectively updating, in a case where the sequence numbers corresponding to the N preset ciphertext types are not completely consistent, preset ciphertext types of the N preset ciphertext types, which correspond to non-maximum sequence numbers, to preset ciphertext types corresponding to edges thereof in the topological sequence, until the sequence numbers corresponding to the N preset ciphertext types are consistent, wherein N is the number of kinds of preset ciphertext types in the at least two preset ciphertext types; and determining a preset ciphertext type in the topological sequence corresponding to the sequence numbers of the N preset ciphertext types as the target ciphertext type.

6. The method according to claim 1, wherein the unidirectional ciphertext conversion relationships pointing to the destination ciphertext types from the original ciphertext types being set among the plurality of preset ciphertext types comprises:

in a case where the unidirectional ciphertext conversion relationships exist between a first preset ciphertext type and a second preset ciphertext type from each other, the plurality of preset ciphertext types comprise a virtual ciphertext type having a ciphertext type the same as the first preset ciphertext type, and a unidirectional ciphertext conversion relationship in which the second preset ciphertext type points to the first preset ciphertext type is replaced with a unidirectional ciphertext conversion relationship that in which the second preset ciphertext type points to the virtual ciphertext type.

7. The method according to claim 1, further comprising:

selecting, in a case where the target ciphertext type does not support a function corresponding to the target function signature, another preset ciphertext type in a path formed between the target ciphertext type and the highest-level preset ciphertext type to update the target ciphertext type, wherein the other preset ciphertext type supports the function corresponding to the target function signature.

8. The method according to claim 1, further comprising:

adjusting, according to a received adjustment instruction, the preset ciphertext types comprised in the plurality of preset ciphertext types and/or any unidirectional ciphertext conversion relationship in the multi-level ciphertext conversion relationship.

9. A non-transitory computer-readable storage medium having a computer program stored thereon, wherein when the program is executed by a processor, steps of the method of claim 1 are implemented.

10. The non-transitory computer-readable storage medium according to claim 9, wherein when the program is executed by the processor, in a case where there are a plurality of preset ciphertext types being simultaneously located in the paths formed between each of the at least two preset ciphertext types and the highest-level preset ciphertext type, the target ciphertext type is a preset ciphertext type at a lowest level.

11. The non-transitory computer-readable storage medium according to claim 9, wherein when the program is executed by the processor, wherein decrypting all the ciphertext operands in the operand set, converting the decrypted ciphertext operands to use the target ciphertext type for representation, and performing the operation on the converted ciphertext operands according to the operation function specified by the target function signature comprises:

decrypting the ciphertext operands corresponding to the at least two preset ciphertext types and a ciphertext operand corresponding to a literal type, then converting the decrypted ciphertext operands respectively to use the target ciphertext type for representation, and performing the operation on the converted ciphertext operands according to the operation function specified by the target function signature.

12. The non-transitory computer-readable storage medium according to claim 9, wherein when the program is executed by the processor, wherein the plurality of preset ciphertext types belong to elements in a lattice-based partially-ordered set, and determining the target ciphertext type corresponding to the at least two preset ciphertext types comprises:

determining a suprema in the partially-ordered set corresponding to the at least two preset ciphertext types corresponding to the ciphertext operands in the operand set, using the suprema as the target ciphertext type.

13. An electronic device comprising a memory, a processor, and a computer program stored in the memory and runnable on the processor, wherein the processor executes the program to perform a hybrid operation on ciphertexts of a plurality of preset ciphertext types, wherein unidirectional ciphertext conversion relationships pointing to destination ciphertext types from original ciphertext types are set among the plurality of preset ciphertext types, and a multi-level ciphertext conversion relationship is formed based on the unidirectional ciphertext conversion relationships, wherein each preset ciphertext type corresponds to a unique level in the multi-level ciphertext conversion relationship, and at least one path constituted by the unidirectional ciphertext conversion relationships exists between each preset ciphertext type and a highest-level preset ciphertext type;

wherein the processor executes the program to perform operations of:

receiving a target function signature and a corresponding operand set, the operand set comprising ciphertext operands corresponding to at least two preset ciphertext types;

determining a target ciphertext type corresponding to the at least two preset ciphertext types, wherein the target ciphertext type is simultaneously located in paths formed between each of the at least two preset ciphertext types and the highest-level preset ciphertext type; and decrypting, in a case where the target ciphertext type supports an operation function specified by the target function signature, all the ciphertext operands in the operand set, converting the decrypted ciphertext operands to use the target ciphertext type for representation, and performing operation on the converted ciphertext operands according to the operation function specified by the target function signature.

14. The electronic device according to claim 13, wherein in a case where there are a plurality of preset ciphertext types being simultaneously located in the paths formed between each of the at least two preset ciphertext types and the highest-level preset ciphertext type, the target ciphertext type is a preset ciphertext type at a lowest level.

15. The electronic device according to claim 13, wherein the processor executes the program to perform operations of:

decrypting the ciphertext operands corresponding to the at least two preset ciphertext types and a ciphertext operand corresponding to a literal type, then converting the decrypted ciphertext operands respectively to use the target ciphertext type for representation, and performing the operation on the converted ciphertext operands according to the operation function specified by the target function signature.

16. The electronic device according to claim 13, wherein the plurality of preset ciphertext types belong to elements in a lattice-based partially-ordered set; and wherein the processor executes the program to perform operations of:

determining a suprema in the partially-ordered set corresponding to the at least two preset ciphertext types corresponding to the ciphertext operands in the operand set, using the suprema as the target ciphertext type.

17. The electronic device according to claim 16, wherein the partially-ordered set is represented based on a topological sequence, edges of respective elements in the topological sequence correspond to the unidirectional ciphertext conversion relationships, and a sequence number in the topological sequence corresponding to an original ciphertext type in each unidirectional ciphertext conversion relationship is smaller than a sequence number in the topological sequence corresponding to a corresponding destination ciphertext type; and wherein the processor executes the program to perform operations of:

comparing sequence numbers in the topological sequence corresponding to N preset ciphertext types of the at least two preset ciphertext types, and respectively updating, in a case where the sequence numbers corresponding to the N preset ciphertext types are not completely consistent, preset ciphertext types of the N preset ciphertext types, which correspond to non-maximum sequence numbers, to preset ciphertext types corresponding to edges thereof in the topological sequence, until the sequence numbers corresponding to the N preset ciphertext types are consistent, wherein N is the number of kinds of preset ciphertext types in the at least two preset ciphertext types; and determining a preset ciphertext type in the topological sequence corresponding to the sequence numbers of the N preset ciphertext types as the target ciphertext type.

18. The electronic device according to claim 13, wherein in a case where the unidirectional ciphertext conversion relationships exist between a first preset ciphertext type and a second preset ciphertext type from each other, the plurality of preset ciphertext types comprise a virtual ciphertext type having a ciphertext type the same as the first preset ciphertext type, and a unidirectional ciphertext conversion relationship in which the second preset ciphertext type points to the first preset ciphertext type is replaced with a unidirectional ciphertext conversion relationship in which the second preset ciphertext type points to the virtual ciphertext type.

19. The electronic device according to claim 13, wherein the processor executes the program to perform operations of:

selecting, in a case where the target ciphertext type does not support a function corresponding to the target function signature, another preset ciphertext type in a path formed between the target ciphertext type and the highest-level preset ciphertext type to update the target ciphertext type, wherein the other preset ciphertext type supports the function corresponding to the target function signature.

20. The electronic device according to claim 13, wherein the processor executes the program to perform operations of:

adjusting, according to a received adjustment instruction, the preset ciphertext types comprised in the plurality of preset ciphertext types and/or any unidirectional ciphertext conversion relationship in the multi-level ciphertext conversion relationship.

\* \* \* \* \*